Dec. 15, 1925.                                        1,566,031
                           I. MARKS
                        DUMP BODY TRUCK
                      Filed April 13, 1925
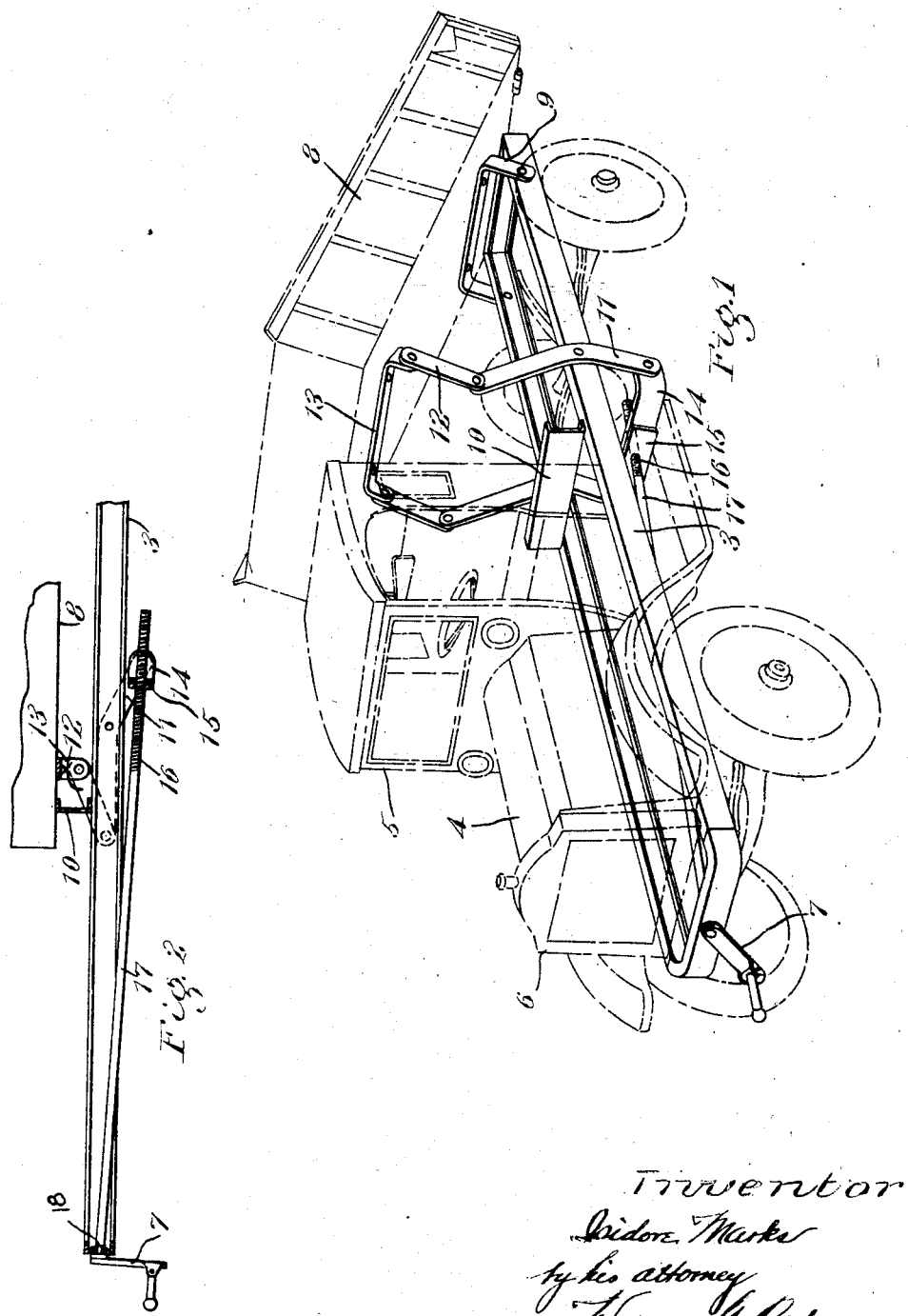

Patented Dec. 15, 1925.

1,566,031

UNITED STATES PATENT OFFICE.

ISIDORE MARKS, OF DORCHESTER, MASSACHUSETTS, ASSIGNOR TO KEYSTONE MFG. CO., OF SOUTH BOSTON, MASSACHUSETTS, A CORPORATION OF MASSACHUSETTS.

DUMP-BODY TRUCK.

Application filed April 13, 1925. Serial No. 22,569.

*To all whom it may concern:*

Be it known that I, ISIDORE MARKS, a citizen of the United States, residing at Dorchester, in the county of Suffolk and State of Massachusetts, have invented certain new and useful Improvements in Dump-Body Trucks, of which the following is a specification.

The present invention relates to dump body trucks and is particularly applicable to toy dump body truck constructions that are substantial copies of the standard construction.

One object of the invention is to provide a novel mechanism for tilting the dumping body of a truck and as an ancillary object to design such mechanism so that it may readily be applied to toys that closely simulate a standard truck, without making it apparent that the truck is a toy because of some feature that is foreign to standard construction. Accordingly a feature of the invention comprises a tilting truck body having connections for moving it to loading or dumping position operated by a hand crank that depends from the front end of the frame, where the engine starting crank is located on power driven trucks.

To the accomplishment of this object, and such others as may hereinafter appear, the various features of the present invention relate to certain devices, combinations and arrangements of parts fully set forth hereinafter, the advantages of which will be readily understood by those skilled in the art.

The various features of the present invention will be best understood from an inspection of the accompanying drawings illustrating the preferred form of the invention as applied to a toy, in which, Figure 1 is a perspective showing a standard motor dump body truck in miniature and the connections from the imitation starting crank for tilting the body, and Fig. 2 is a detail sectional elevation of the connections from the imitation starting crank to the tilting body.

The toy dump body truck illustrated in the drawings comprises a standard motor truck in miniature provided with a frame 3, a hood 4, a cab 5, a radiator 6, a hand starting crank 7, and a tilting body 8. All these parts simulate closely the design of a dumping truck mounted on a commercial Packard chassis.

The body 8 is secured to an arm 9 the downturned ends of which are pivoted on the frame 3. Normally the front end of the tilting body 8 rests upon a support 10 bridging the parallel sides of the frame 3.

In order to tilt the body 8 on its rear pivotal connection with the frame 3 through manipulation of the hand crank 7 the body 8 is pivoted at its front end to the frame 3 through a pair of toggles. Each of the toggles comprises a lever 11, of the first order, centrally pivoted to one of the sides of the frame 3, and a link 12 pivoted at one end to one of the free ends of the lever 11. The other end of the link 12 is pivoted to a downturned end of an arm 13 secured to the body 8. The other free ends of the levers 11 depend below the frame 3 and are pivotally connected to an arm or cross bar 14 extending below the frame 3. The arm 14 carries an internally threaded nut 15 engaged with the screw threaded portion 16 of a crank shaft 17 to which the hand crank 7 is secured at the front side of the forward end of the frame 3. While the crank shaft 17 is permitted a slight pivotal movement in the opening in the frame 3 through which it extends the shaft 17 is held from longitudinal movement by a shoulder 18 formed on the shaft within the forward end of the frame 3 (Fig. 2).

Normally the parts are in the position of Fig. 2 with the body 8 resting on the support 10 parallel to the frame. Rotation of the starting crank in a clockwise direction causes the nut 15 to travel towards the crank end of the shaft 17. This action straightens the pair of toggles from the position of Fig. 2 into the position of Fig. 1 thereby tilting the body 8 about its rear pivotal connection with the frame 3. The threads on the screw-threaded portion 16 are somewhat coarse to prevent relative movement of the portion 16 and the nut 15 other than through a rotary movement of the shaft 17. The screw-threaded portion 16 thus acts as an irreversible driving connection to hold the body 8 in any position to which it has been tilted within its limit of movement. Rotation of the crank in a counter-clockwise direction returns the body 8 to its normal position.

It will be clear to those skilled in the art and with the general object of the present invention in view, that changes may be made in the details of structure, the described and illustrated embodiment being intended as an exploitation of its underlying essentials the features whereof are definitely stated in their true scope in the claims herewith.

What is claimed as new, is:

1. In a dump body truck construction having its body pivotally connected at its rear end to the frame, means at the forward end of the body operable to raise the body to dumping position, a hand crank depending from the frame at the front side of its forward end, and direct connections between said crank and body raising means for operating the latter when the crank is rotated.

2. In a dump body truck construction having its body pivotally connected at its rear end to the frame, a toggle under the forward end of the body connected at its ends to the body and the frame functioning to raise the body to dumping position when opened, a hand crank depending from the frame at the front side of its forward end, and direct connections between said crank and body raising toggle for opening and closing it when the crank is rotated.

3. In a dump body truck construction having its body pivotally connected at its rear end to the frame, means at the forward end of the body operable to raise the body to dumping position, a hand crank depending from the frame at the front side of its forward end, and a longitudinally immovable crank shaft extending rearward from said crank within the frame, having a threaded connection to said body raising means.

4. In a dump body truck construction having its body pivotally connected at its rear end to the frame and its forward end supported by toggles pivotally connected to the frame, a cross bar having a threaded socket connecting said toggles below the frame, a shaft having its rear end threaded in said socket and its forward end projecting through an opening in the forward end of the frame, a hand crank on said projecting end for rotating the shaft and making and breaking the toggles, and means to prevent longitudinal movement of said shaft while it rotates.

5. In a dump body truck construction having its body pivotally connected at its rear end to the frame and its bottom substantially parallel to the frame when in loading position, two levers pivoted centrally on the frame, one at each side, having their forward ends connected to the forward end of the body by links and having their rear ends depending below the frame, an arm extending between said rear ends and pivotally connected to each, means arranged longitudinally within the frame operable to move said arm in a direction to swing said depending rear lever ends downward and forward and thus raise said body about its rear frame pivot, and a device at the front side of the forward end of the frame for operating said means.

6. In a dump body truck construction having its body pivotally connected at its rear end to the frame, means above the frame at the forward end of the body operable to raise the body to dumping position, a rotatable shaft below the body for actuating said body raising means, and a hand crank at the front side of the forward end of the frame for rotating said shaft.

ISIDORE MARKS.